April 17, 1928. 1,666,571
J. KERSTEN
SOUND AMPLIFYING HORN
Filed March 28, 1927 3 Sheets-Sheet 1

Inventor
Jacob Kersten
By Frank E. Liverance, Jr.
Attorney.

Inventor
Jacob Kersten

April 17, 1928.  
J. KERSTEN  
SOUND AMPLIFYING HORN  
Filed March 28, 1927
1,666,571
3 Sheets-Sheet 3
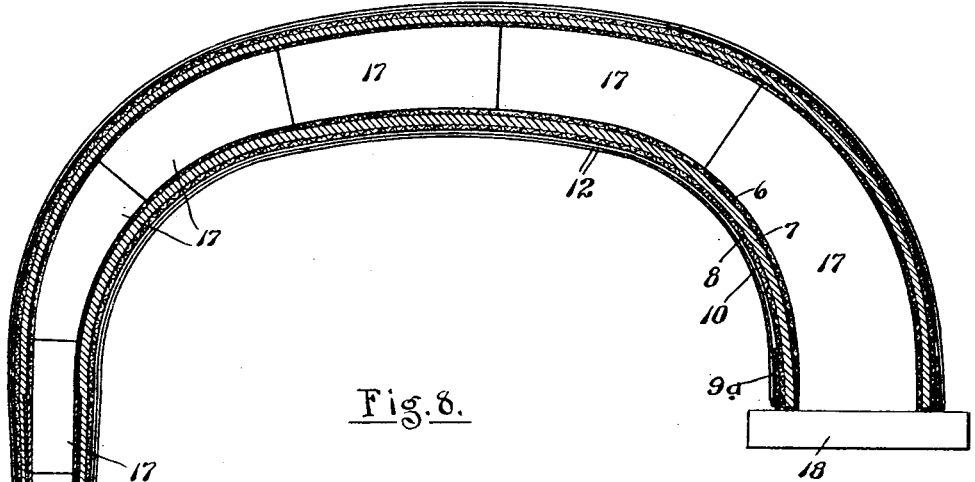
Fig. 8.
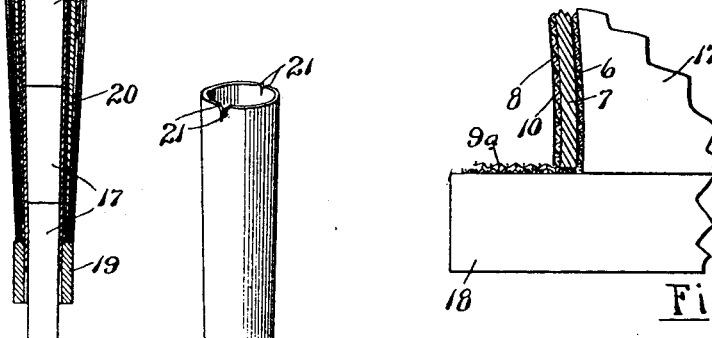
Fig. 9.
Fig. 10.
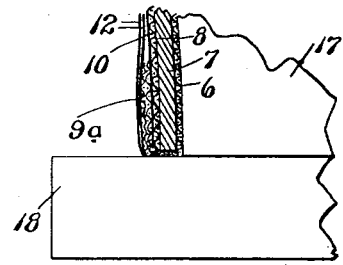
Fig. 11.
Inventor  
Jacob Kersten  
By Frank E. Liverance, Jr.  
Attorney Patented Apr. 17, 1928.

1,666,571

UNITED STATES PATENT OFFICE.

JACOB KERSTEN, OF KALAMAZOO, MICHIGAN.

SOUND-AMPLIFYING HORN.

Application filed March 28, 1927. Serial No. 178,851.

This invention relates to an amplifying horn and the method of constructing the same, the horn being particularly adapted for use with loud speaker units. It is an object and purpose of the present invention to construct a horn which has an exceptionally long length but which can be placed in a small space, the horn being very compact so that it is very easily and readily housed within a cabinet without the necessity of constructing an overly large cabinet. Another purpose and object of the invention is to construct the horn of plastic and easily worked materials so that the same may be molded to any desired shape over a properly shaped mold and which when finished will be durable and will have desired acoustic properties.

For an understanding of the invention, reference may be had to the following description taken in connection with the accompanying drawings, in which, Fig. 1 is an elevation of a completed amplifying horn made in accordance with the invention.

Fig. 8 is a longitudinal section through the smaller end section of the horn showing how the same is built around the mold used.

Figure 1:
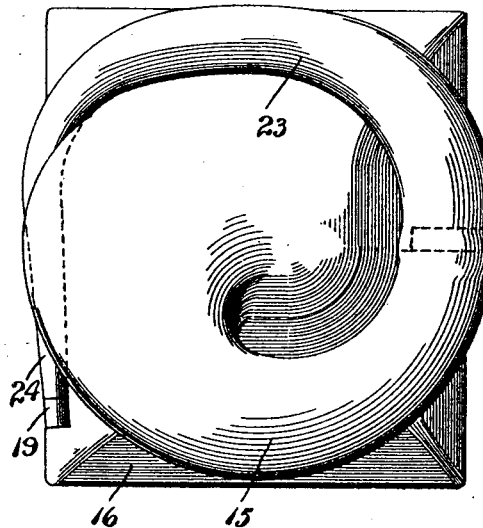

Figs. 9 and 10 are views similar to views 6 and 7 illustrating substantially like steps of the horn construction for the second and smaller section thereof, and Fig. 11 is a perspective view of the sleeve member used as a part of the horn construction and to which the loud speaker unit is to be attached.

Like reference characters refer to like parts in the several figures of the drawings.

The amplifying horn of my invention is built in two sections. The larger section is built over a mold the larger end of which is indicated at 1 and which, at its underside has a downwardly projecting supporting base 2 of less linear dimensions than the end of the mold 1. The mold is of the proper shape for the horn and is ordinarily built up of a plurality of connected sections 3 and 4, the latter having a reduced part 5 at its outer end of smaller diameter than the smallest end of the section 4. The manner in which these mold sections are secured together and detached when the horn is finished so as to be removed therefrom forms no part of the present invention.

Figure 3:
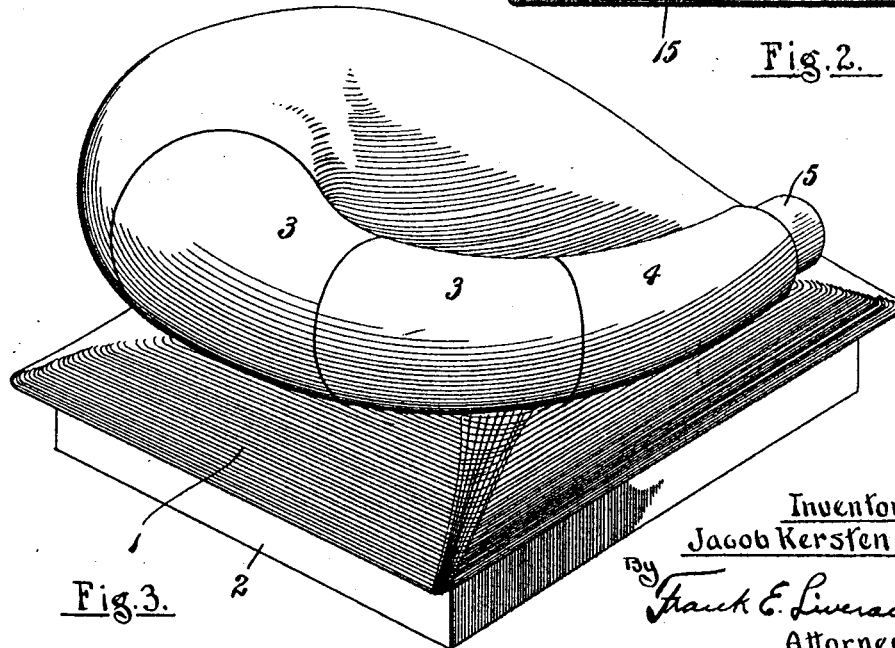
Fig. 3 is a perspective view of the mold used for making one section of the horn.
Figure 4:
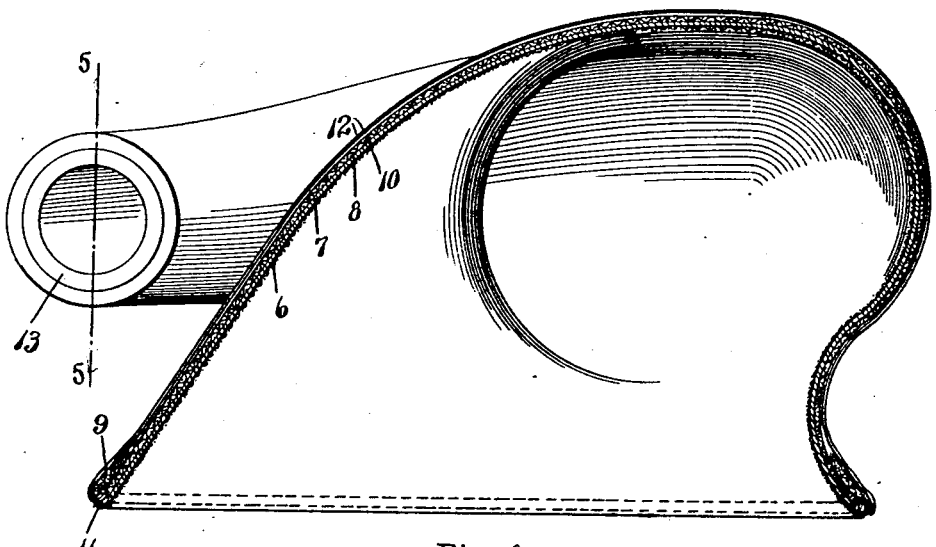
Fig. 4 is a section, somewhat enlarged, taken on the plane of line 4—4 of Fig. 2.
Figure 5:
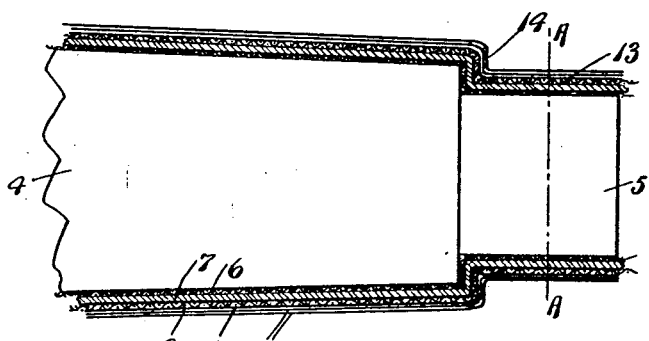
Fig. 5 is an enlarged fragmentary vertical section taken substantially on the plane of line 5—5 of Fig. 4.
Figure 6:
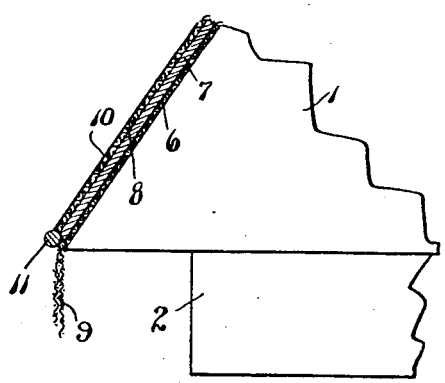
Fig. 6 is a fragmentary section illustrating the manner in which the various materials first used in building the horn are applied to the larger end of the mold, Fig. 5 illustrating the application thereof at the smaller end of the mold.
Figure 7:
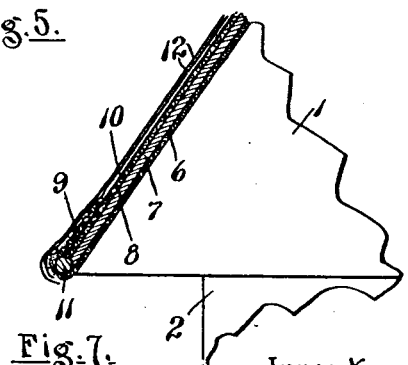
Fig. 7 is a similar view illustrating the method followed in completing the horn.

Over this mold, which is shown in Fig. 3, in the first instance, knitted fabric indicated at 6 is placed the same being of suitable tubular form that it may be drawn and stretched over the mold, extending below the lower edges of the larger end portion 1 of said mold, and also beyond the end of the reduced portion 5. The knitted fabric as thus stretched is opened considerably as is evident.

After the knitted fabric has been placed over the mold a cementitious composition 7, the principal ingredients of which are plaster of Paris mixed with dextrine, is placed over the knitted fabric 6 the thickness of the composition being substantially one-eighth of an inch. When this has been placed completely over the fabric 6, a layer of burlap 8 is next placed over the composition material. The burlap is not stretchable and is cut to proper shape that it may entirely cover the cementitious composition 7. At the large end 1 of the mold both the fabric 6 and the burlap 8 are extended downwardly below the edges of the mold making the depending ends 9, shown. Over the burlap a thickness of paper or papier mâché 10 is next placed and cemented in position.

When this has been done, a rectangular ring 11 of proper dimensions is placed over the form and brought against the burlap 8 forcing the same into the cementitious composition 7. This ring, which is made of wire, extends entirely around and closely adjacent the extreme lower edges of the enlarged end 1 of the mold. The depending ends 9 of the fabric 6 and burlap 8 are then turned upwardly and around the ring or frame 11 and back against the outer side of the paper 10. It is to be understood that the cementitious composition has sufficient adhesive properties to cause the burlap to closely adhere thereto but in any case where the material will not of itself adhere, suitable cementing agents are used for the purpose. And when the depending ends 9 of the fabric and burlap are turned under the frame 11 and back upon the paper 10 the same are cemented in place. The horn is then finished by applying two thicknesses 12 of suitable tough paper over the paper or papier mâché 10 and cementing the same in place. The paper 12 used is what is ordinarily known as red rosin paper.

Figure 2:
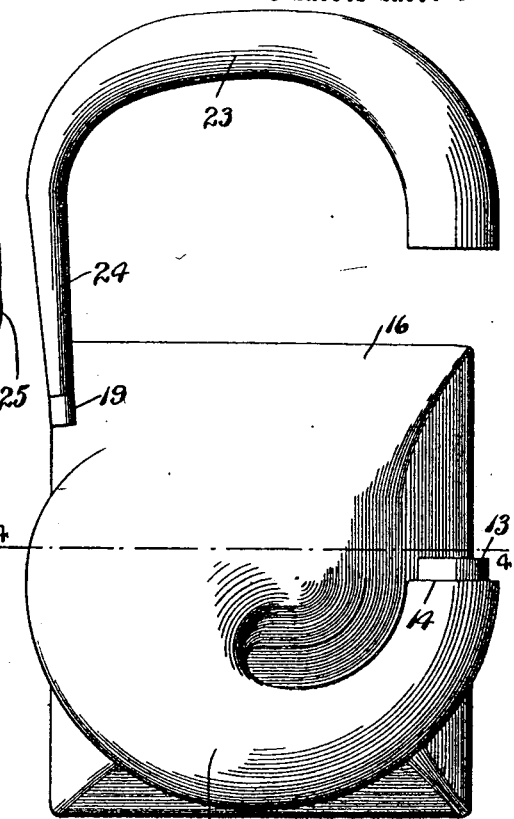
Fig. 2 is an elevation showing the two sections as the horn is made in the first instance separated from each other.

At the end of the mold at which the reduced portion 5 is located, the fabric 6 cementitious composition 7, burlap 8, papier mâché 10 and sheets 12 conform to the shape of the mold so that the horn has an end 13 of smaller diameter than the remainder of the horn with a shoulder 14 between it and the adjacent larger portions. After the horn has dried out and set in shape the reduced section 13 is finished by sawing a portion of the same off as on the plane of line A—A. The section of the horn thus made over the mold shown in Fig. 3 is of the shape shown in lower part of Fig. 2, having a large open end or bell 16 from which the horn extends and progressively decreases in size as indicated at 15, terminating in the reducing end 13.

The remaining section of the horn is made in a much similar manner. The mold used comprises a series of sections 17 connected together but capable of ready detachment, the section 17 of the mold at its larger end having a base 18, shown in Fig. 8. The knitted fabric 6, cementitious composition 7, burlap 8, paper or papier mâché 10 and the final finishing sheets 12 of red rosin paper are applied in the same way, except that no wire ring similar to the ring 11 is used anywhere. The projecting ends 9ᵃ of the fabric 6 and burlap 8 are turned upwardly from the position in which they appear in Fig. 9 lying against the upper side of the base 18, and cemented against the paper 10 without the use of any reinforcing ring or frame.

Also at the opposite smaller end of the form before the construction of this horn section is started, a sleeve member is placed over the form comprising a metal sleeve 19 interiorly threaded at one end and having connected thereto and projecting from its other end a relatively long tapered sleeve 20 of thin sheet metal. The free end portion of the sleeve 20 is cut a short distance and adjacent parts turned outwardly to make anchors 21 over which the knitted fabric 6 is drawn and which project somewhat into the cementitious composition 7. Sleeve 20 is of metal sufficiently thick that when the horn section is completed its outer surface and the outer surface of the final sheet 12 used are substantially flush.

The second section of the horn, the construction of which has just been described, when taken from the mold, comprises a substantially curved portion 23 and a straight tapered portion 24 the length of which is substantially equal to the length of the sleeve 20. The metal sleeve 19 may have the loud speaker unit attached thereto by screw connection with the interiorly threaded open free end of the said sleeve.

The two sections of the horn when completed are joined together by placing the end of the portion 23 over the reduced section 13 cementing and joining the same together in any manner suitable as by a cementing tape, making a joint such as indicated at 25 in Fig. 1.

It is evident that the horn may be made of various shapes and configurations so as to occupy very compact space and at the same time having a sufficient length of air column to greatly amplify sound waves passing thereto from a loud speaker unit at the small end of the horn. The manner in which the horn is constructed is very practical and efficient. The materials used are cheap, are cemented together quickly and easily, and when finished have desired acoustic properties for sound amplifying and modulation. The interior surface of the horn particularly at the large end or bell thereof is finished with any suitable finishing material which will completely fill the pores of the fabric 6 and make a smooth surface. The outer surface of the horn is finished by merely spraying lacquer thereon. When thus finished the horn is ready for installation in a cabinet.

The invention is defined in the appended claims and is to be considered comprehensive of all forms of structure coming within their scope.

I claim:

1. An amplifying horn, comprising an inner rigid body of cementitious material, stretched elastic fabric on the inner side of the horn inside of said body, inelastic coarse fabric on the outer side of said body, and tough paper outside of and covering the second fabric.

2. A construction containing the elements in combination defined in claim 1, combined with a continuous wire reinforcing ring around the larger end of the horn and covered by said fabrics and paper.

3. An amplifying horn comprising, a rigid body of cementitious material, an inner fabric lining for the body, an outer fabric covering said body and paper covering the second fabric.

4. An amplifying horn comprising, a rigid body of cementitious material, an inner fabric lining, an outer fabric covering for the body, a ring around the larger end of the horn wrapped in said fabrics, and paper covering the outer fabric, substantially as described.

In testimony whereof I affix my signature.

JACOB KERSTEN.